(12) United States Patent
Mrotzek et al.

(10) Patent No.: US 9,790,599 B2
(45) Date of Patent: Oct. 17, 2017

(54) COMPOSITION HAVING A CORROSION PROTECTION LAYER AND PROCESS FOR THE PRODUCTION THEREOF

(75) Inventors: Manfred Mrotzek, Buxtehude (DE); Raimund Sicking, Neukirchen-Vluyn (DE)

(73) Assignee: Hydro Aluminum Deutschland GmbH, Bonn (DE)

( * ) Notice: Subject to any disclaimer, the term of this patent is extended or adjusted under 35 U.S.C. 154(b) by 71 days.

(21) Appl. No.: 12/812,686

(22) PCT Filed: Jan. 14, 2009

(86) PCT No.: PCT/EP2009/050357
§ 371 (c)(1),
(2), (4) Date: Sep. 15, 2010

(87) PCT Pub. No.: WO2009/090186
PCT Pub. Date: Jul. 23, 2009

(65) Prior Publication Data
US 2011/0042050 A1  Feb. 24, 2011

(30) Foreign Application Priority Data
Jan. 18, 2008 (EP) .................................... 08100655

(51) Int. Cl.
*B32B 15/01*  (2006.01)
*C22C 21/00*  (2006.01)
(Continued)

(52) U.S. Cl.
CPC ............ *C23C 30/00* (2013.01); *B22D 11/007* (2013.01); *C22C 21/00* (2013.01); *F28F 19/06* (2013.01);
(Continued)

(58) Field of Classification Search
USPC ....... 420/529, 531, 535, 537, 540–549, 552, 420/553; 428/615, 650, 651, 654
See application file for complete search history.

(56) References Cited

U.S. PATENT DOCUMENTS

| 3,859,058 A | 1/1975 | Anthony et al. |
| 4,203,490 A | 5/1980 | Terai et al. |

(Continued)

FOREIGN PATENT DOCUMENTS

| CH | 608034 | * 12/1974 | ............. C22C 21/00 |
| DE | 1 205 793 B | 11/1965 | |

(Continued)

OTHER PUBLICATIONS

English Machine translation of JP H11-269590, JPO, created Feb. 25, 2014.*

(Continued)

*Primary Examiner* — Humera Sheikh
*Assistant Examiner* — Lucas Wang
(74) *Attorney, Agent, or Firm* — Reinhart Boerner Van Deuren P.C.

(57) ABSTRACT

A composite material can include a carrier material that is coated, at least over part of the surface, with a corrosion protection layer made of an aluminum alloy. The composite material can provide a defined, effective, durable corrosion protection and simultaneously have a high recycling potential. The aluminum alloy of the corrosion protection layer can have the following composition in % by weight:

$0.8 \leq Mn \leq 1.8$
$Zn \leq 0.05$
$Cu \leq 0.05$
$Si \leq 1.0$ (Continued)

-continued

Cr ≤ 0.25
Zr ≤ 0.25
Mg ≤ 0.10 remainder aluminum and unavoidable impurities, individually a maximum of 0.05% by weight, in total a maximum of 0.15% by weight.

17 Claims, 1 Drawing Sheet

(51) Int. Cl.
  *C23C 30/00* (2006.01)
  *B22D 11/00* (2006.01)
  *F28F 19/06* (2006.01)
(52) U.S. Cl.
  CPC ........ *Y02T 50/67* (2013.01); *Y10T 428/12764* (2015.01)

(56) References Cited

U.S. PATENT DOCUMENTS

| | | | |
|---|---|---|---|
| 4,244,756 A | 1/1981 | Tanabe et al. | |
| 4,632,885 A | 12/1986 | Tanabe et al. | |
| 6,705,384 B2* | 3/2004 | Kilmer et al. | 164/461 |
| 6,743,396 B2* | 6/2004 | Wagner et al. | 420/534 |
| 2002/0142185 A1* | 10/2002 | Kilmer | 428/654 |
| 2004/0028940 A1 | 2/2004 | Lane et al. | |
| 2005/0034793 A1* | 2/2005 | Henry | B22D 11/003 148/551 |
| 2006/0003181 A1 | 1/2006 | Rajagopalan | |
| 2007/0122648 A1* | 5/2007 | Vieregge et al. | 428/654 |

FOREIGN PATENT DOCUMENTS

| | | | |
|---|---|---|---|
| DE | 24 53 668 A1 | 5/1975 | |
| DE | 24 58 201 A1 | 6/1976 | |
| DE | 10 2004 033 457 B4 | 12/2007 | |
| EP | 1 075 935 | 2/2001 | |
| EP | 2 090 425 B1 | 10/2013 | |
| EP | 2692524 B1 | 10/2014 | |
| GB | 1 486 030 | 9/1977 | |
| JP | 56 044742 | 4/1981 | |
| JP | 57 158350 | 9/1982 | |
| JP | H02-099325 | 4/1990 | |
| JP | 2 243734 | 9/1990 | |
| JP | 6 128674 | 5/1994 | |
| JP | H10-298686 | 11/1998 | |
| JP | 11-172357 A | 6/1999 | |
| JP | H11-269590 | * 10/1999 | ............ C22C 21/00 |
| JP | 2000 087162 | 3/2000 | |
| JP | 2000204427 A | 7/2000 | |
| JP | 2001105175 A | 4/2001 | |
| JP | 2005523164 A | 8/2005 | |
| JP | 2008-240084 | * 10/2008 | ............ C22C 21/00 |
| WO | WO01/36697 | * 5/2001 | |
| WO | WO 03/089237 A1 | 10/2003 | |

OTHER PUBLICATIONS

International Search Report for International Application No. PCT/EP2009/050357.

Hatch, John E. (American Society for Metals); Aluminum Properties and Physical Metallurgy; Metals Park, Ohio; May 1984; pp. 100, 372 and 373.

Engström and L.-O. Gullman; A Multilayer Clad Aluminum Material with Improved Brazing Properties; presented in Chicago, Illinois in Mar. 1987; pp. 222-226.

* cited by examiner

COMPOSITION HAVING A CORROSION PROTECTION LAYER AND PROCESS FOR THE PRODUCTION THEREOF

CROSS-REFERENCE TO RELATED APPLICATIONS

This application is a National Phase application of International Application No. PCT/EP2009/050357, filed on Jan. 14, 2009, which claims the benefit of and priority to European Patent Application No. EP 08100655.3, filed on Jan. 18, 2008. The disclosures of the above applications are incorporated herein by reference in their entirety.

FIELD OF THE INVENTION

The invention relates to a composite material having a carrier material, wherein the carrier material is coated, at least over part of the surface, with a corrosion protection layer made of an aluminum alloy. Furthermore, the invention relates to a method for producing a composite material of this type and the use of a composite material of this type for coolant-guiding components of heat carriers or heat exchangers, in particular pipes.

BACKGROUND OF THE INVENTION

Composite materials are known and are used, for example, for components of heat carriers or heat exchangers in aircrafts or motor vehicles. Thus, carrier materials made of a corrosion-sensitive aluminum alloy may be coated with alloys, which have at least one corrosion potential-reducing element, for example zinc, tin or indium. These are frequently subjected to a heat treatment at temperatures of above 450° C., for example 575° C. to 610° C., when soldering the heat exchanger. The use of zinc as a corrosion potential-reducing element is, however, affected by the problem that zinc may diffuse rapidly and scarcely controllably from the corrosion protection layer into the carrier material. This leads to the fact that the carrier material also becomes baser and more susceptible to corrosion. Furthermore, zinc-containing corrosion protection layers also experience a rapid material removal owing to corrosive media, as the depth of the attack and material removal by corrosive media cannot be controlled. The corrosion protection brought about by zinc is therefore of a comparatively short duration. The use of tin and/or indium as a corrosion potential-reducing element is problematical, on the other hand, in that their presence severely impairs the recyclability of the alloys, as fractions of tin or indium in aluminum alloys are only suitable for a few applications. The tin and/or indium fractions therefore would firstly have to be laboriously separated out in order to be able to recover aluminum of high purity which is suitable for diverse applications.

Furthermore, it is known to coat a carrier material made of an aluminum-manganese alloy with a coating made of an aluminum-silicon alloy. In this composite material, for example at temperatures of 575° C. to 610° C., silicon diffuses from the applied layer out of an aluminum-silicon alloy into the carrier material and causes precipitations of manganese compounds in the manganese-supersaturated mixed crystals of the carrier material. The corrosion potential of the precipitated manganese compounds is lower than the corrosion potential of the remaining carrier material, so the precipitated manganese compounds can act as a corrosion protection. However, the depth to which the silicon diffuses into the carrier material, and therefore the thickness of the layer having the precipitated manganese compounds, sensitively depend on the process conduct during the production of the composite material and on the heat treatment. This requires a high degree of precision and also complex process monitoring techniques during production.

SUMMARY OF THE INVENTION

In one aspect, the invention includes a composite material that provides a defined, effective and durable corrosion protection and simultaneously has a high recycling potential. In another aspect, the invention includes a method for producing a composite material of this type.

In various aspects, the invention includes an aluminum alloy of the corrosion protection layer that has the following composition in % by weight:

$0.8 \leq Mn \leq 1.8$
$Zn \leq 0.05$
$Cu \leq 0.05$
$Si \leq 1.0$
$Cr \leq 0.25$
$Zr \leq 0.25$
$Mg \leq 0.10$ remainder aluminum and unavoidable impurities, individually a maximum of 0.05% by weight, in total a maximum of 0.15% by weight.

It was surprisingly found that the manganese content between 0.8% by weight and 1.8% by weight of the alloy provided as a corrosion protection layer allows a high density of finely distributed manganese-containing precipitations. In this manner, the corrosion potential of the corrosion protection layer is lowered. The corrosion potential of the corrosion protection layer can be about 30 mV lower than the corrosion potential of the carrier material. Furthermore, the fraction of copper and zinc should in each case be at most 0.05% by weight. Owing to the low fractions of copper and zinc, the formation of local elements, which result in a galvanically very active surface and therefore an increased material removal caused by corrosion, is inhibited. The corrosion resistance of the corrosion protection layer is therefore increased. Furthermore, the recyclability of the composite material and the products produced therefrom are positively influenced by the low copper and zinc fractions and by the limitation of the silicon, chromium and zirconium content of the alloy. The fraction of magnesium should be at most 0.10% by weight so that the solderability of a workpiece consisting of the alloy is optionally not impaired when using a Si-containing aluminum solder by a magnesium impurity of the flux. Owing to the aluminum alloy mentioned above, the corrosion protection layer only provides a small area for attack for inter-crystalline corrosion or pitting corrosion even after heat treatment. The material removal caused by corrosion can therefore be kept low. Rather, corrosion in the composite material, if at all, manifests itself by a poorly pronounced trough-shaped attack, in which the average diameter is greater than the average depth of the trough. Owing to the small average depth, the probability of penetration of corrosion attacks into corrosion-sensitive regions of the carrier material can be reduced. The corrosion protection layer is preferably applied to the carrier material on one or both sides.

In one configuration of the composite material, the manganese content of the aluminum alloy of the corrosion protection layer is 1.0% by weight to 1.8% by weight, preferably 1.2% by weight to 1.8% by weight. Owing to the slight increase in the manganese fraction of the aluminum alloy of the corrosion protection layer, the formation of finely distributed manganese-containing precipitations, which are significant for the corrosion protection, can be promoted still further. However, above 1.8% by weight, in the structure of the corrosion protection layer, coarse manganese precipitations may form because of the limited solubility of the manganese. These coarse precipitations may basically lead to a reduced corrosion resistance of the corrosion protection layer.

Furthermore, the aluminum alloy of the corrosion protection layer may have 0.4% by weight to 1.0% by weight silicon. Parts of the silicon present in the corrosion protection layer may diffuse into the carrier material and cause additional finely distributed manganese-containing precipitations there, which promote the corrosion resistance of the carrier material. The extent of the diffusion of the silicon from the corrosion protection layer into the carrier material depends, in particular because of the defined silicon fraction in the corrosion protection layer only on the silicon content of the carrier material, and therefore on the concentration gradients of the silicon. Particularly when the silicon content of the carrier material is at most 0.4% by weight, a well-defined silicon diffusion from the corrosion protection layer into the carrier material can therefore be caused. Furthermore, layers with basically any silicon fraction, for example AlSi solders, may additionally be applied to the side of the corrosion protection layer remote from the carrier material. Owing to the defined silicon content of the corrosion protection layer, a silicon diffusion, which is possibly difficult to control, from the additional outer layer through the corrosion protection layer into the carrier material is inhibited. The stability of the properties of the composite material can therefore be better ensured.

In another configuration of the composite material, the aluminum alloy of the corrosion protection layer has 0.05% by weight to 0.25% by weight chromium and/or 0.05% by weight to 0.25% by weight zirconium. Corresponding chromium and/or zirconium fractions in particular increase the average grain size of the structure of the corrosion protection layer. As a result, the depth up to which silicon diffuses from an additional silicon-containing outer layer into the corrosion protection layer can be controlled. However, above a chromium or zirconium content of 0.25% by weight, respectively, coarse primary precipitations may occur, which in turn impair the structure of the corrosion protection layer.

Furthermore, the carrier material can be configured from aluminum or an aluminum alloy, in particular from an Al—Mn—Cu alloy. Aluminum or aluminum alloys in particular can have advantageous forming properties, so the composite material can be formed into components for diverse purposes of use. Furthermore, aluminum or aluminum alloys can have weight advantages, in particular in comparison to many other metals or metal alloys such as steel, which has a particularly advantageous effect when components consisting of aluminum or aluminum alloys are provided for weight-sensitive applications, for example in aircrafts or motor vehicles. It is particularly preferred for the carrier material to be configured from an Al—Mn—Cu alloy. Alloys of this type are preferred as the carrier material of composite materials which are used in heat exchangers.

In yet another configuration of the composite material, the carrier material is coated over the entire surface with the corrosion protection layer. This is in particular advantageous when the composite material is to be suitable for diverse, different applications. However, it is also possible to coat the carrier material only over part of the surface with the corrosion protection layer. For example, it could be sufficient to only coat the part surfaces of the composite material which come into contact with a corrosive environment after production of a moulded part formed from the composite material, with the corrosion protection layer. Thus, the outlay for production can be better adapted to the requirements to be satisfied by the moulded part produced.

Furthermore, a corrosion protection layer is preferably coated, on its side remote from the carrier material, at least over part of the surface, with an outer layer. Furthermore, the carrier material may be coated with at least one outer layer on its side remote from the corrosion protection layer. The outer layer may consist of aluminum or another aluminum alloy, in particular of an Al—Si alloy. As a result, there is the possibility of equipping the composite material with still further functional layers, for example to achieve a solderability from both sides of the carrier material. In this case, it may be advantageous if the carrier material is coated on both sides with the corrosion protection layer.

The invention also includes a method for producing a composite material as described above, in which a carrier material is coated at least over a part of the surface with a corrosion protection layer made of an aluminum alloy as described above, wherein the corrosion protection layer is applied by simultaneous casting, plating or spraying.

Owing to the use of plating, large quantities of the composite material with a well defined thickness of the corrosion protection layer may be produced in an economical manner, whereby a particularly good connection between the carrier material and the corrosion protection layer is achieved by the plating. The spray application of the corrosion protection layer may moreover ensure that the corrosion protection layer is applied uniformly, in a defined manner and in particular with a spatially high resolution onto the carrier material. This spraying is therefore especially preferred to apply a corrosion protection layer arranged over part of the surface on the carrier material. Simultaneous casting of the corrosion protection layer with the carrier material in turn leads to a reduction in the number of working steps to produce the corrosion protection layer on the carrier material. A separate plating or a separate spray application of the aluminum alloy for a corrosion protection layer on the carrier material is then no longer necessary. However, a combination of plating, spray application and/or simultaneous casting is also conceivable, for example when further functional layers, for example outer layers, are required.

Furthermore, however, any outer layers can also be applied by means of a simultaneous casting method, plating method or spray method, for example onto the corrosion protection layer but also onto the carrier material.

With regard to further advantages of the method according to the invention, reference is made to the statements with regard to the composite material according to the invention.

The invention also includes a heat exchanger, comprising at least one component, in particular a coolant-guiding component, consisting of a composite material according to the invention. The heat exchanger is, on the one hand, resistant to corrosion and can simultaneously be well recycled.

The use of the composite material according to the invention for coolant-guiding components in heat carriers or heat exchangers is advantageous, in particular, because components of this type may frequently only have small wall thicknesses for weight minimisation reasons. If corrosion attacks on these components with small wall thicknesses are not adequately inhibited by a corrosion protection layer, however, the tightness of the coolant-guiding components may be damaged by attacks going deep, such as inter-crystalline corrosion or pitting corrosion. On the other hand, owing to the effect of the corrosion protection layer according to the invention, corrosion on the coolant-guided components, if at all, manifests in a poorly pronounced trough-like attack, in which the average diameter is greater than the average depth of the trough.

The tightness of the coolant-guiding components is therefore less at risk.

There are a large number of possibilities for configuring and developing the composite material according to the invention or the method for the production thereof and heat exchangers produced therefrom. For this purpose, reference is made to the summary, descriptions, and drawings.

DESCRIPTION OF THE INVENTION

Figure 1:
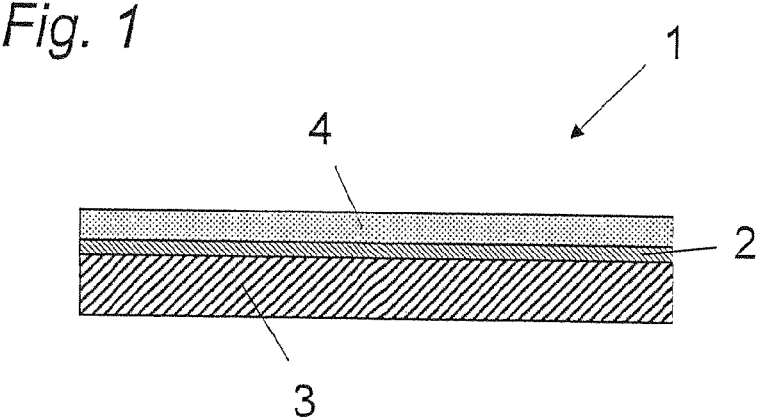
FIG. 1 shows a schematic sectional view through an exemplary embodiment of a composite material according to the invention.

FIG. 1 shows a schematic sectional view of an embodiment of a composite material 1 according to the invention. The composite material 1 has a corrosion protection layer 2, a carrier material 3, for example made of an aluminum-manganese-copper alloy, and an additional outer layer 4, preferably a layer made of an aluminum-silicon alloy. The outer layer 4 is not absolutely necessary, however. The carrier material 3 may also be formed from pure aluminum or from another aluminum alloy. The outer layer 4 may also be configured from pure aluminum or an aluminum alloy. The carrier material 3 and the outer layer 4 may moreover optionally consist of the same material. The corrosion protection layer 2 consists of an aluminum alloy having the following alloy constituents in % by weight:

$$0.8 \le Mn \ 1.8$$
$$Zn \le 0.05$$
$$Cu \le 0.05$$
$$Si \le 1.0$$
$$Cr \le 0.25$$
$$Zr \le 0.25$$
$$Mg \le 0.10$$

remainder aluminum and unavoidable impurities, individually a maximum of 0.05% by weight, in total a maximum of 0.15% by weight.

The manganese fraction may optionally also be selected from the range of 1.0% by weight to 1.8% by weight, in particular also from 1.2% by weight to 1.8% by weight. Optionally, a chromium and/or zirconium content of 0.05% by weight to 0.25% by weight in each case may optionally be provided in the aluminum alloy of the corrosion protection layer 2. The aluminum alloy of the corrosion protection layer 2 may also additionally have 0.4% by weight to 1.0% by weight silicon. The corrosion protection layer 2 exhibits good corrosion protection behaviour on contact with corrosive media. In particular, corrosion appears in the regions of the composite material 1 protected by the corrosion protection layer only, if at all, by a poorly pronounced trough-like attack, in which the average diameter is greater than the average depth of the trough. Composite materials 1 and coolant-guiding components produced therefrom for heat carriers or heat exchangers and reject materials occurring during production can be recycled very well as the alloy composition neither comprises zinc, tin or indium.

In the embodiment shown in FIG. 1, the carrier material 3 is only coated on one side with the corrosion protection layer 2 and an outer layer 4. However, it is also possible to coat the carrier material 3 on both sides with a corrosion protection layer and optionally a further outer layer; a coating over part of the surface, in which, for example, only the regions which are in contact with a corrosive medium are coated, is also conceivable. Furthermore, the side of the carrier material 3 remote from the corrosion protection layer 2 may also be provided with at least one outer layer 4, if this is expedient.

Figure 2:
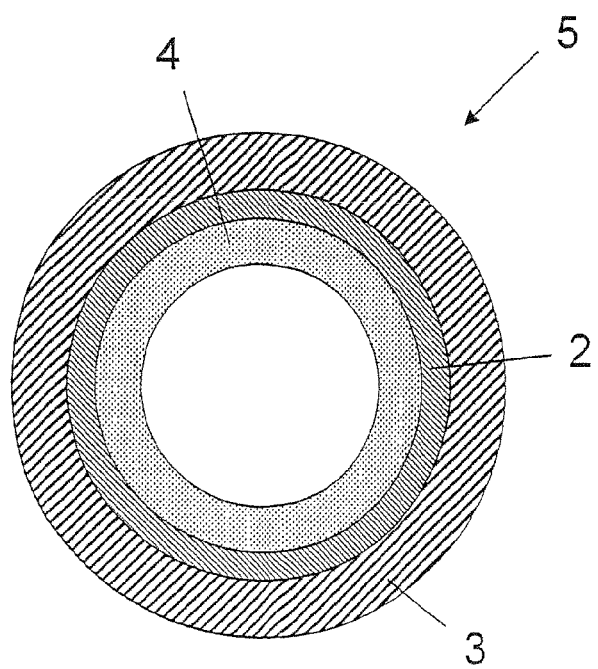
FIG. 2 shows a schematic sectional view of a coolant-guiding component of an exemplary embodiment of a heat exchanger according to the invention in the form of a pipe.

FIG. 2 shows a pipe 5 produced from the composite material 1 in a schematic cross-sectional view. The composite material 1 may, however, apart from pipes 5, basically also be used to produce any other components. The corrosion protection layer 2 and the outer layer 4 made of an aluminum-silicon alloy, which is arranged, in this example, on the side of the carrier material 3 facing the interior of the tube, are generally connected by plating to the carrier material 3 made of an aluminum-manganese-copper alloy. A cooling medium, for example, may be guided in the interior of the pipe 5, the corrosion protection layer 2 protecting the carrier material 3 from corrosion.

Instead of the above-mentioned plating of the corrosion protection layer 2 and the outer layer 4 to the carrier material 3, it is also possible to simultaneously cast the carrier material 3, the corrosion protection layer 2 and/or the outer layer 4 to form a corresponding composite material and to form it in subsequent working steps into a pipe 5. A further alternative production mode is to apply the corrosion protection layer 2 and/or the outer layer 4 by means of spraying onto the carrier material 3. Any combination of the aforementioned method is, of course, also conceivable.

The pipe 5 shown in FIG. 2, in this example, has a round cross-section. It is, however, also possible to produce pipes 5 with any different type of, for example ellipsoidal, rectangular, polygonal, tapering or similar cross-sections from the composite material. Finally, many other configurations of the pipe 5 with the corrosion protection layer 2 and optionally an outer layer 4 are conceivable. Thus, the carrier material 3 may additionally or alternatively to the example shown in FIG. 2 have, on the outer peripheral surface, a corrosion protection layer 2 and optionally an outer layer 4.

The invention claimed is:

1. A composite material, having a carrier material, wherein the carrier material is coated, at least over part of the surface, with a corrosion protection layer made of an aluminium alloy, wherein said corrosion protection layer is in direct contact with the carrier material and wherein the carrier material is formed from an Al—Mn—Cu-alloy and wherein the aluminium alloy of the corrosion protection layer consists of the following composition in % by weight:

$$0.8 \le Mn \le 1.8$$
$$Zn \le 0.05$$
$$Cu \le 0.05$$
$$0.4 \le Si \le 1.0$$
$$Cr \le 0.25$$
$$Zr \le 0.25$$
$$Mg \le 0.10$$

remainder aluminium and unavoidable impurities, individually a maximum of 0.05% by weight, in total a maximum of 0.15% by weight, wherein the alloy of the corrosion protection layer contains Zn, Cu, and Mg.

2. The composite material of claim 1, wherein the Mn content of the aluminium alloy of the corrosion protection layer is 1.0 to 1.8% by weight.

3. The composite material of claim 1, wherein the aluminium alloy of the corrosion protection layer additionally has 0.05 to 0.25% by weight chromium.

4. The composite material of claim 1, wherein the carrier material is coated over the entire surface with the corrosion protection layer.

5. The composite material of claim 1, wherein the corrosion protection layer is coated, on its side remote from the carrier material, at least over part of the surface, with an outer layer.

6. The composite material of claim 1, wherein the carrier material is coated, on its side remote from the corrosion protection layer, with at least one outer layer.

7. The composite material of claim 5, wherein the outer layer is formed from aluminium or an aluminium alloy.

8. A method for producing the composite material of claim 1, wherein a carrier material is coated, at least over part of the surface, with the corrosion protection layer made of an aluminium alloy, and wherein the corrosion protection layer is applied by simultaneous casting, plating, or spraying.

9. The method of claim 8, wherein the carrier material is coated over the entire surface with the corrosion protection layer.

10. The method of claim 8, wherein the corrosion protection layer is coated, on its side remote from the carrier material, at least over part of the surface, with an outer layer.

11. The method of claim 8, wherein the carrier material, is coated, on its side remote from the corrosion protection layer, with at least one outer layer.

12. The method of claim 10, wherein the outer layer is applied by means of a simultaneous casting method, plating method or spray method.

13. A heat exchanger comprising a coolant-guiding component and the composite material of claim 1.

14. The composite material of claim 1, wherein the Mn content of the aluminium alloy of the corrosion protection layer is 1.2 to 1.8% by weight.

15. The composite material of claim 5, wherein the outer layer is formed from an Al—Si alloy.

16. The composite material of claim 1, wherein the aluminum alloy of the corrosion protection layer additionally has 0.05% by weight to 0.25% by weight zirconium.

17. A composite material, having a carrier material, wherein the carrier material is coated, at least over part of the surface, with a corrosion protection layer made of an aluminium alloy, wherein said corrosion protection layer is in direct contact with the carrier material and wherein the carrier material is formed from an Al—Mn—Cu-alloy and wherein the aluminium alloy of the corrosion protection layer consists of the following composition in % by weight:

$0.8 \leq Mn \leq 1.8$
$0.4 \leq Si \leq 1.0$
$Cr \leq 0.25$
$Zr \leq 0.25$
$Mg \leq 0.10$ remainder aluminium and unavoidable impurities, individually a maximum of 0.05% by weight, in total a maximum of 0.15% by weight, wherein the alloy of the corrosion protection layer contains Zn and Cu, and wherein the corrosion protection layer is free of levels of Zn and Cu beyond 0.05% by weight, individually.

* * * * *

UNITED STATES PATENT AND TRADEMARK OFFICE
CERTIFICATE OF CORRECTION

| | |
|---|---|
| PATENT NO. | : 9,790,599 B2 |
| APPLICATION NO. | : 12/812686 |
| DATED | : October 17, 2017 |
| INVENTOR(S) | : Manfred Mrotzek et al. |

It is certified that error appears in the above-identified patent and that said Letters Patent is hereby corrected as shown below:

On the Title Page

Item [73], delete "Hydro Aluminum Deutschland" and replace with --Hydro Aluminium Deutschland--

In the Claims

Claim 16, Line 2, delete "aluminum" and replace with --aluminium--

Signed and Sealed this
Twelfth Day of December, 2017

Joseph Matal
*Performing the Functions and Duties of the*
*Under Secretary of Commerce for Intellectual Property and*
*Director of the United States Patent and Trademark Office*